June 27, 1967 R. M. SEELEY, JR 3,328,608

TRANSISTORIZED BISTABLE MULTIVIBRATOR HAVING BREAKDOWN DIODES IN BASE-VOLTA-SETTING NETWORKS

Filed March 26, 1965

INVENTOR.
RALPH M. SEELEY, JR.
BY
V. C. MULLER
ATTORNEY.

United States Patent Office 3,328,608
Patented June 27, 1967

3,328,608
TRANSISTORIZED BISTABLE MULTIVIBRATOR HAVING BREAKDOWN DIODES IN BASE-VOLTAGE-SETTING NETWORKS

Ralph M. Seeley, Jr., Matilda, Pa., assignor, by mesne assignments, to the United States of America as represented by the Secretary of the Navy Filed Apr. 30, 1965, Ser. No. 452,407
6 Claims. (Cl. 307—88.5)

ABSTRACT OF THE DISCLOSURE

A bistable multivibrator having for each transistor therein a collector-base circuit including a breakdown diode and a pair of diodes at whose junction an input pulse is received and having cross-coupling diodes each extending between a respective breakdown diode of a respective transistor and the base of the other transistor.

Figure 1:
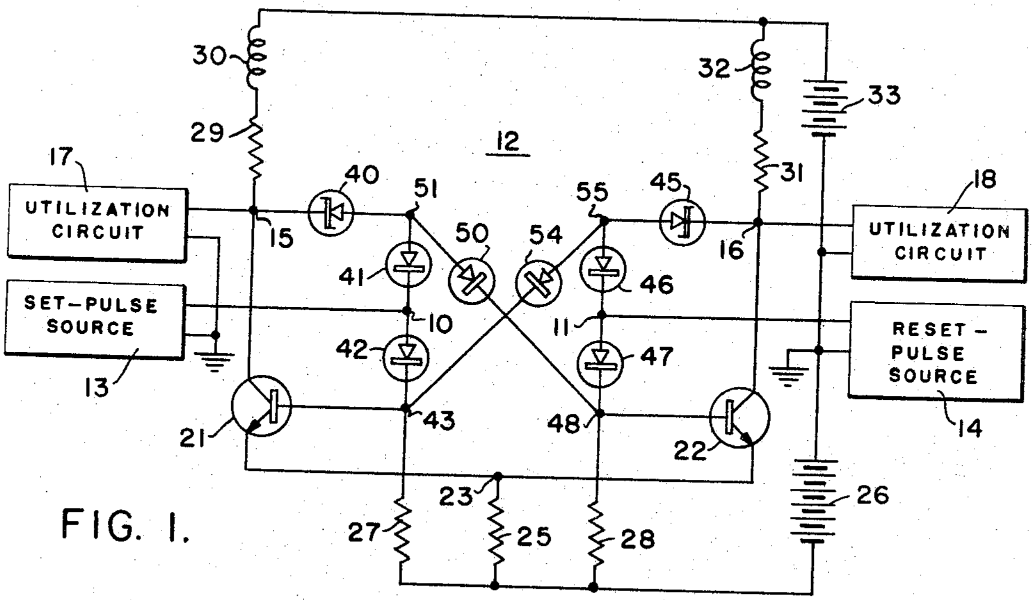

This invention relates to multivibrator circuits, and particularly to fast-response bistable multivibrator circuits utilizing semi-conductor diodes and transistors.

Prior art bistable multivibrators which are designed to operate (change state) rapidly following application of an input pulse, and which are designed to operate at high input pulse repetition frequencies, ordinarily require comparatively complex (and therefore costly) circuitry and imposition of severe restrictions upon input signal characteristics in order to avoid instability problems arising from stray input signals and from internal circuit condition variations. Apart from the disadvantage of requiring complex circuitry, the immunity of prior art multivibrator circuits to spurious operation is often only nominal. By way of example, fast-acting multivibrator circuits generaly include steering diodes in current-carrying condition in circuit arrangements which are intended to render the multivibrator circuit responsive only to input pulses of preselected polarity; however, if such a multivibrator circuit receives stray signals or input pulses of wrong polarity and which turn off the steering diode current, the transistor input circuit becomes sufficiently upset to result in a spurious change of state.

The present invention concerns an improved bistable multivibrator circuit wherein a pair of transistors is employed in association with bias reference, blocking, steering and cross-coupling diodes in such manner that the multivibrator circuit is fast-acting but neverthless inherently stable.

It is an object of the present invention to provide a novel bistable multivibrator circuit which presents improved operating characteristics, which is inherently temperature-compensated so as to maintain proper bistability, and which cannot spuriously change state because of internal circuit condition variations.

It is another object of the invention to prvoide an improved bistable multivibrator circuit which is reponsive only to input signal transitions of preselected variation-sense applied to the OFF-side, immune to actuation by input signal transitions of either sense applied to the ON-side.

It is another object of the invention to provide a novel bistable multivibrator circuit wherein the input charge requirements are inherently small, wherein duration of the input pulse after initial transition is not limited insofar as affecting multivibrator circuit stability is concerned, wherein the output transition times are comparatively short, and wherein the pulse source for the waiting side of the multivibrator circuit is only lightly loaded during triggering action.

It is a further object of the invention to provide an improved bistable multivibrator circuit, wherein comparatively inexpensive semi-conductor diodes rather than auxiliary transistors are employed in association with the basic pair of switching transistors, correspondingly effecting reduction in cost and complexity.

Other objects, advantages and novel features of the invention will become apparent from the following detailed description of the invention considered in conjunction with the accompanying drawing wherein:

FIG. 1 is a detailed schematic circuit embodying the invention; and

Figure 2:
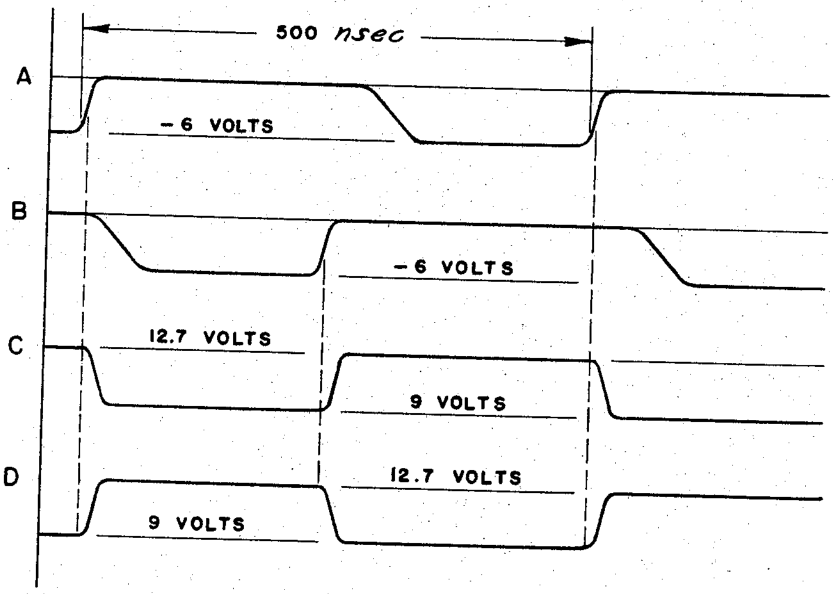

FIG. 2 presents a series of waveforms taken at various points in the FIG. 1 circuit.

While the invention disclosed herein may of course be applied to provide bistable multivibrator circuits utilizing either PNP or NPN type transistors and further may be employed or adapted for various applications, it will be described exemplarity with reference to a bistable multivibrator circuit employing NPN transistors, and wherein the multivibrator circuit arrangement is of SET-RESET type and responsive to the positive-going transition of an input signal applied to the waiting side.

Referring therefore specifically to the exemplary bistable multivibrator system embodying the present invention as illustrated in detailed circuitry form in FIG. 1, input points 10 and 11 of the SET and RESET sides, respectively, of multivibrator circuit 12, are supplied through coupling capacitors, not shown, with binary pulse streams from pulse sources 13 and 14, the pulse streams in this instance comprising pulses, as illustrated by curves A and B of FIG. 2, which are asymmetrical in duty cycle and which occur at say a 2 mc./s rate, correspondingly having a 500 n.sec. (nano-second) period. The resultant output signals available at points 15 and 16, having waveforms as illustrated at C and D, respectively, of FIG. 2, are applied to utilization circuits 17 and 18.

The multivibrator circuit itself employs two NPN transistors 21 and 22, in association with several semi-conductor diodes, in a circuit arranged for base-triggering operation of the transistors by the positive-going transitions of the input pulses. The emitter electrodes of transistors 21 and 22 are connected together at junction point 23 and through common resistor 25 to the negative side of electrical source 26, to which side are also connected the base electrodes through resistors 27 and 28; the collector electrodes of transistors 21 and 22 are connected through resistor 29 and inductor 30, and resistor 31 and inductor 32, respectively, to the positive side of electrical source 33. The junction of the positive and negative sides of sources 26 and 33, respectively, serves as the ground or voltage reference for the system.

The novel multivibrator circuit combination is completed by a special network of semi-conductor diodes: a backwardly-poled zener (breakdown) diode 40, and forwardly-poled blocking and input diodes 41 and 42, respectively, are connected in that order between points 15 and 43 which lead to the collector and base electrodes, respectively, of transistor 21; similiarly, a backwardly-poled zener diode 45, and forwardly-poled blocking and input diodes 46 and 47, respectively, are connected in that order between points 16 and 48 which lead to the collector and base electrodes, respectively, of transistor 22; coupling diode 50 is forwardly-poled and connected between junction point 51 (between zener diode 40 and blocking diode 41) and point 48 leading to resistor 28 and to the base electrode of transistor 22; coupling diode 54 is forwardly-poled and connected between junction point 55 (between zener diode 45 and blocking diode 46) and point 43 leading to resistor 27 and to the base electrode of transistor 21.

The circuit components are selected and proportioned, in accordance with electronic design techniques, in such manner that all diodes are in ON condition on the OFF transistor side, and all diodes are in OFF condition on the ON transistor side. Loop coupling during transitions is provided by the common emitters plus the breakdown diode back capacitance in series with the stored charge of the cross-coupling diode. Since the combination of diodes from collector to base on the OFF side is such as to keep the input diode ON, a positive input swing wastes little voltage in causing transistor turn-on. Further, since the diodes are all nominally OFF in the string from the ON collector to ON base, no input pulse, either positive or negative, can trigger the multivibrator circuit on the ON side, and only positive transistions will have an effect on the OFF side.

By way of example, typical specifications of components which have been found satisfactory for the described multivibrator circuit embodying the present invention are as follows:

| | |
|---|---|
| Transistors **21, 22** | 2N708 |
| Diodes **40, 45** (zener) | 1N756A |
| Diodes **41, 46** (silicon) | 1N252 |
| Diodes **42, 47, 50, 54** (germanium) | 1N695 |
| Resistor **25** ohms | 800 |
| Resistors **27, 28** do | 25,000 |
| Resistors **29, 31** do | 100 |
| Inductors **30, 32** microhenry | 0.3 |
| Voltage source **26** volts | −20 |
| Voltage source **23** do | +13 |

While the inductor units are not essential to operation of the described multivibrator circuit, they are preferably included for the purpose of enhancing the speed with which the multivibrator reverses its state in response to a triggering input signal, as described in U.S. Patent No. 2,924,725 entitled "Pulse Steering Circuit," to R. R. Blair, issued Feb. 9, 1960. Inductors 30 and 32 may conveniently be provided in the form of ferrite RF bead chokes.

In order to assist in providing an understanding of the manner in which the described multivibrator circuit operates, it is convenient to list voltages and currents found by measurement at various points in the circuit, employing components as listed above, with the SET-side transistor in OFF condition and correspondingly with the RESET-side transistor in ON condition:

| | |
|---|---|
| Point **23** volts | 3.5 |
| Point **15** do | 12.7 |
| Point **51** do | 4.5 |
| Point **10** do | 3.75 |
| Point **43** do | 3.5 |
| Point **16** do | 9.0 |
| Point **48** do | 4.25 |
| Point **55** (approx.) do | 1 |
| Point **11** (approx.) do | 2 |
| Resistor **25** current (approx.) ma | 30 |
| Resistor **27** current (approx.) ma | 1 |
| Resistor **28** current (approx.) ma | 1 |

Zener diodes 40 and 45 in this instance are of a type which exhibit breakdown conduction when they are exposed to greater than about 8.1 volts. It may also be remarked at this point that the utilization circuits (17 and 18) in this instance are to be understood as of such type, for example employing a biased input transistor circuit, that they draw negligible current when the voltage applied thereto is of the order of 9 volts as at the ON side of the multivibrator circuit, and say about 2 ma. when the voltage applied thereto is 12.7 volts as at the OFF side of the multivibrator circuit.

The ON transistor current of approximately 30 ma. through resistor 25 causes the voltage at the emitter electrodes to be 3.5 volts. With transistor 22 in ON condition as indicated above, there is a comparatively large voltage drop across resistor 31; diodes 45, 46 and 47 in the series circuit including resistors 31 and 28 are therefore in so-called OFF condition, that is, with only a very small leakage current therethrough. Diode 54 in the series circuit including diode 45 and resistors 31 and 27 is likewise in OFF condition. With transistor 21 in OFF condition, there is little voltage drop across resistor 29; diodes 40, 41 and 42 in the series circuit including resistors 29 and 27, and likewise diode 50 in the series circuit including diode 40 and resistors 29 and 28, are therefore in ON condition, resulting in 3.5 volts at point 43 and thus at the base electrode of transistor 21, and 4.25 volts at point 48 and thus at the base electrode of transistor 22. In the absence of triggering voltages, transistors 21 and 22 thus remain in OFF and ON conditions, respectively.

Referring now to the manner in which the described circuit operates to effect a change of multivibrator state, and again assuming the SET-side transistor 21 to be in OFF condition, application of a positive-going voltage transition to the OFF side, from set-pulse source 13 through the coupling capacitor to point 10 (that is, to the junction of diodes 41 and 42), raises the voltage at that point, and because of the conductive condition of diode 42, likewise raises the voltage at point 43 leading to the base electrode of transistor 21, thus taking transistor 21 out of its fully OFF condition. During the brief turn-on transition time of transistor 21, its collector current through resistor 29 rises to a value producing sufficient voltage drop at point 15 to turn off each of the diodes in the network on the SET-side, reducing the voltage at point 48 leading to the base electrode of transistor 22, thus causing transistor 22 to begin changing state toward an OFF condition, lowering the transistor 22 collector current, increasing the voltage at point 16, and turning the diodes in the network on the RESET-side to an ON condition. The voltage at point 48 correspondingly drops sharply to 3.5 volts, turning transistor 22 OFF and completing the change of state of multivibrator circuit 12. Transistors 21 and 22 then remain in ON and OFF conditions, respectively, until application of a positive-going transition to the RESET-side.

Obviously many modifications and variations of the present invention are possible in the light of the above teachings. It is therefore to be understood that within the scope of the appended claims the invention may be practiced otherwise than as specifically described.

What is claimed is:

1. A bistable multivibrator circuit comprising, in combination:
(a) a pair of transistors, each having a base, a collector and an emitter;
(b) said collectors being connected through respective impedances to a source of collector supply voltage;
(c) said bases being connected through base resistors to a source of bias supply voltage;
(d) said emitters being connected together and through an emitter resistor to said source of bias supply voltage;
(e) a first pair of base-voltage-setting networks each including a breakdown diode and resistive means connected between each collector and its corresponding base; and
(f) a second pair of base-voltage-setting networks each including cross-coupling resistive means connected from the junction of each said breakdown diode and said resistive means associated with one transistor to the base of the other transistor;
(g) whereby when either transistor is in ON condition the other transistor is in OFF condition;
(h) and whereby the diodes associated with the OFF transistor are in ON condition, and those associated with the ON transistor are in OFF condition.

2. A bistable multivibrator circuit comprising, in combination:
(a) a pair of transistors, each having a base, a collector and an emitter;

(b) said collectors being connected through respective impedances to a source of collector supply voltage;
(c) said bases being connected through base resistors to a source of bias supply voltage;
(d) said emitters being connected together and through an emitter resistor to said source of bias supply voltage;
(e) a first pair of base-voltage-setting networks each including a breakdown diode and resistive means connected between each collector and its corresponding base; and
(f) a second pair of base-voltage-setting networks each including a cross-coupling diode connected from the junction of each said breakdown diode and said resistive means associated with one transistor to the base of the other transistor;
(g) whereby when either transistor is in ON condition the other transistor is in OFF condition;
(h) and whereby the diodes associated with the OFF transistor are in ON condition, and those associated with the ON transistor are in OFF condition.

3. A bistable multivibrator circuit comprising, in combination:
(a) a pair of transistors, each having a base, a collector and an emitter;
(b) said collectors being connected through respective impedances to a source of collector supply voltage;
(c) said bases being connected through base resistors to a source of bias supply voltage;
(d) said emitters being connected together and through an emitter resistor to said source of bias supply voltage;
(e) a first pair of base-voltage-setting networks each including a breakdown diode, an input blocking diode and an input steering diode poled and connected in that order between each collector and its corresponding base; and
(f) a second pair of base-voltage-setting networks each including a cross-coupling resistive means connected from each said breakdown diode associated with one transistor to the base of the other transistor;
(g) whereby when either transistor is in ON condition the other transistor is in OFF condition;
(h) and whereby the diodes associated with the OFF transistor are in ON condition, and those associated with the ON transistor are in OFF condition.

4. A bistable multivibrator circuit comprising, in combination:
(a) a pair of transistors, each having a base, a collector and an emitter;
(b) said collectors being connected through respective impedances to a source of collector supply voltage;

(c) said bases being connected through base resistors to a source of bias supply voltage;
(d) said emitters being connected together and through an emitter resistor to said source of bias supply voltage;
(e) a pair of first base-voltage-setting networks each including a breakdown diode, an input blocking diode and an input steering diode poled and connected in that order between each collector and its corresponding base; and
(f) a pair of second base-voltage-setting networks each including cross-coupling diode connected from each said breakdown diode associated with one transistor to the base of the other transistor;
(g) whereby when either transistor is in ON condition the other transistor is in OFF condition;
(h) and whereby the diodes associated with the OFF transistor are in ON condition, and those associated with the ON transistor are in OFF condition.

5. A bistable multivibrator circuit comprising, in combination:
(a) a pair of transistors each having a base and a collector;
(b) a pair of first base-voltage-setting networks for each said transistor, each said first network including a breakdown diode, an input blocking diode and an input steering diode poled and connected in that order between said collector of the associated transistor and said base of the associated transistor; and
(c) a pair of second base-voltage-setting networks for each said transistor, each said second network including cross-coupling resistive means connected between said breakdown diode of the associated transistor and said base of the other transistor;
(d) whereby when either transistor is in ON condition, the other transistor is in OFF condition;
(e) and whereby the diodes associated with the OFF transistor are in ON condition and those associated with the ON transistor are in OFF condition.

6. A bistable multivibrator circuit according to claim 5 wherein:
(a) said cross-coupling resistive means of each of said second networks comprises a diode.

References Cited

UNITED STATES PATENTS

| | | | |
|---|---|---|---|
| 3,223,853 | 12/1965 | Charbonnier | 307—88.5 |
| 3,226,566 | 12/1965 | Lacher | 307—88.5 |

ARTHUR GAUSS, *Primary Examiner.*

J. JORDAN, *Assistant Examiner.*